United States Patent
Kusakabe

(10) Patent No.: US 10,148,410 B2
(45) Date of Patent: Dec. 4, 2018

(54) COMMUNICATION SYSTEM AND COMMUNICATION DEVICE

(71) Applicant: QUADRAC Co., Ltd., Tokyo (JP)

(72) Inventor: Susumu Kusakabe, Tokyo (JP)

(73) Assignee: QUADRAC CO., LTD., Tokyo (JP)

( * ) Notice: Subject to any disclaimer, the term of this patent is extended or adjusted under 35 U.S.C. 154(b) by 69 days.

(21) Appl. No.: 15/306,364

(22) PCT Filed: Apr. 25, 2014

(86) PCT No.: PCT/JP2014/061683
§ 371 (c)(1),
(2) Date: Oct. 24, 2016

(87) PCT Pub. No.: WO2015/162776
PCT Pub. Date: Oct. 29, 2015

(65) Prior Publication Data
US 2017/0048056 A1    Feb. 16, 2017

(51) Int. Cl.
*H04L 5/22* (2006.01)
*H04L 1/08* (2006.01)
*H04L 5/00* (2006.01)
*H04L 25/493* (2006.01)
*H04B 1/02* (2006.01)

(52) U.S. Cl.
CPC ............... *H04L 5/225* (2013.01); *H04L 1/08* (2013.01); *H04L 5/00* (2013.01); *H04L 25/493* (2013.01); *H04B 1/02* (2013.01)

(58) Field of Classification Search
None
See application file for complete search history.

(56) References Cited

U.S. PATENT DOCUMENTS

| | | | |
|---|---|---|---|
| 5,844,952 A | 12/1998 | Ito et al. | |
| 8,923,445 B1* | 12/2014 | Abbaszadeh | H04L 27/22 375/322 |
| 9,209,966 B1* | 12/2015 | Hossain | H03L 7/087 |
| 2002/0018446 A1 | 2/2002 | Huh et al. | |
| 2002/0027889 A1* | 3/2002 | Yun | H04W 36/06 370/331 |
| 2005/0172179 A1* | 8/2005 | Brandenberger | G06F 11/1012 714/718 |

(Continued)

FOREIGN PATENT DOCUMENTS

EP   2 490 340 A1   8/2012
JP   64-24536 A   1/1989

OTHER PUBLICATIONS

Wikipedia: The Free Encyclopedia, "Multiplexing", http://ja.wikipedia.org/wiki/multiplexing, Internet, retrieved Apr. 21, 2014, total 13 pages.

*Primary Examiner* — Bunjob Jaroenchonwanit
(74) *Attorney, Agent, or Firm* — Birch, Stewart, Kolasch & Birch, LLP

(57) ABSTRACT

Provided is a communication system in which one transmission path is shared by a plurality of communication devices, wherein the plurality of communication devices each includes a transmitter that repeatedly transmits one packet to the transmission path with a period of the communication device until a prescribed condition is satisfied, and a receiver that integrates a signal on the transmission path over a period of another communication device until a prescribed condition is satisfied.

6 Claims, 3 Drawing Sheets

(56) References Cited

U.S. PATENT DOCUMENTS

| | | | |
|---|---|---|---|
| 2007/0047566 A1* | 3/2007 | Hardie | H04L 12/2856 370/420 |
| 2008/0279267 A1* | 11/2008 | Nakanishi | H04L 25/03133 375/224 |
| 2013/0185610 A1* | 7/2013 | Ould-Cheikh-Mouhamedou | H03M 13/1102 714/752 |
| 2015/0103876 A1* | 4/2015 | Amirkhany | H03K 5/24 375/233 |

* cited by examiner

COMMUNICATION SYSTEM AND COMMUNICATION DEVICE

TECHNICAL FIELD

This invention relates to a communication system and a communication device.

BACKGROUND ART

There is a known technique for transmitting data sent from a plurality of communication devices through a single shared transmission path (see for example NPL 1). Frequency-division multiple access (FDMA), time-division multiple access (TDMA), and code-division multiple access (CDMA) are examples of the technique.

CITATION LIST

Non Patent Literature

[NPL 1] "Multiplexing" in *Wikipedia: The Free Encyclopedia*, available from ja.wikipedia.org/wiki/multiplexing, Internet, retrieved Apr. 21, 2014

SUMMARY OF INVENTION

Technical Problem

According to the conventional multiplexing techniques as described above, however, it may be difficult to start or continue communication when the communication environment is degraded or the communication distance increases.

Solution to Problem

The present invention provides a communication system in which one transmission path is shared by a plurality of communication devices, wherein the plurality of communication devices each include a transmitter that repeatedly transmits one packet to the transmission path with a period of the communication device until a prescribed condition is satisfied, and a receiver that integrates a signal on the transmission path over a period of another communication device until a prescribed condition is satisfied.

Advantageous Effects of Invention

In the communication system and communication device described above, communication may be started or continued when for example the communication environment is degraded or the communication distance increases.

DESCRIPTION OF EMBODIMENTS

[Communication System According to First Embodiment]

Figure 1:
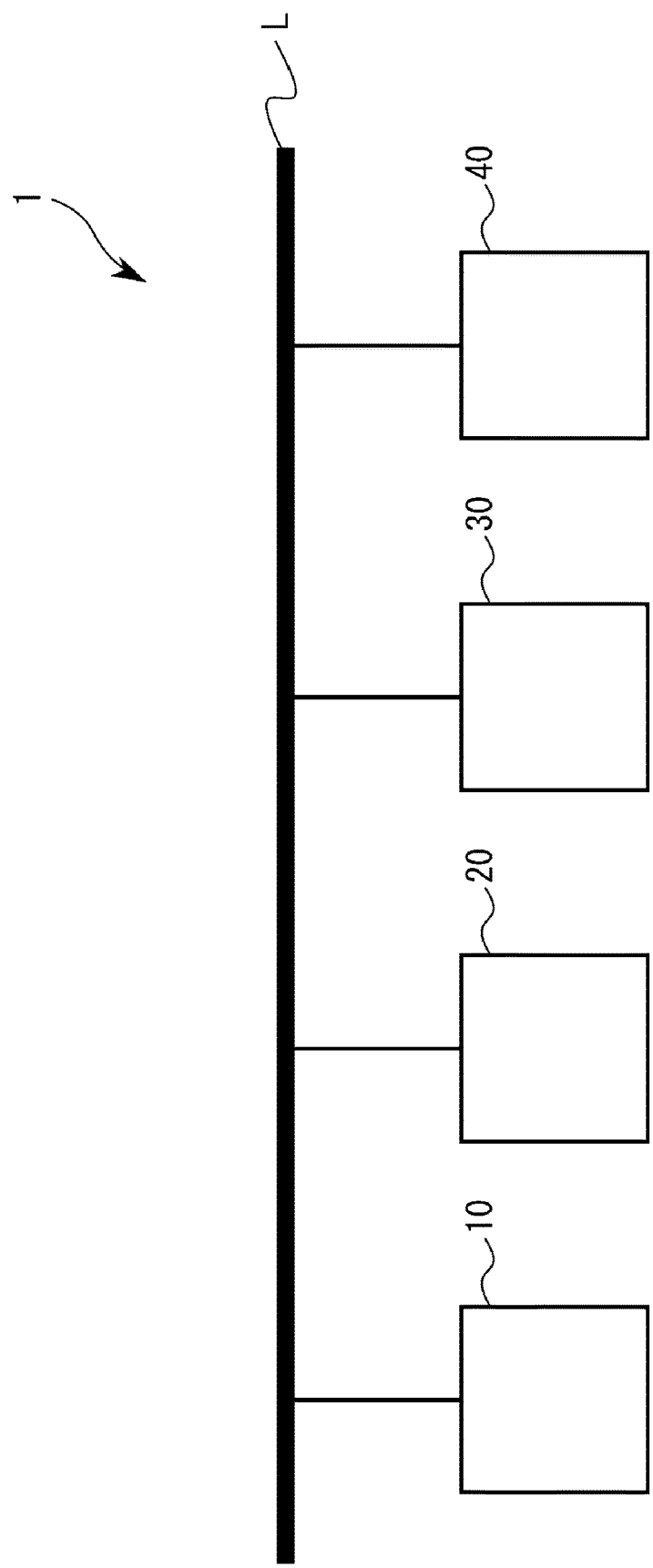
FIG. 1 is a schematic diagram of an exemplary communication system according to a first embodiment.

FIG. 1 is a schematic diagram showing an exemplary communication system according to a first embodiment. As shown in FIG. 1, a communication system 1 according to the first embodiment has a transmission path L shared by a plurality of communication devices 10 to 40, each of the plurality of communication devices 10 to 40 includes a transmitter that repeatedly transmits one packet to the transmission path L with the period of the communication device (for example a period T1 for the communication device 10) until a prescribed condition is satisfied, and a receiver that integrates a signal on the transmission path L over the periods of the other communication devices (for example at least one of periods T2, T3, and T4 for the communication device 10) until a prescribed condition is satisfied.

In the communication system according to the first embodiment, packets sent out from the plurality of communication devices 10 to 40 may be limitlessly amplified (in amplitude) while they are individually distinguished, and therefore communication can be started or continued when for example the communication environment is degraded or the communication distance (the distance between communication devices) increases.

The communication system according to the first embodiment may implemented as a communication system for which the communication distance (the distance between communication devices) is not fixed (an example of which is a turnstile system at a train station that starts communication in response to increased proximity to the turnstile and allows continued communication as the distance from the turnstile increases). For example, the use of the communication system according to the first embodiment allows for stable operation of a communication network used in a variable communication environment and having a changeable communication distance (for example a network including a plurality of wireless devices with sensors arranged in a space to collect data or wireless communication spots provided in the town).

Now, the embodiment will be described in detail.

(Transmission Path L)

The transmission path L is shared by the plurality of communication devices 10 to 40. The kind of the transmission path L is not limited. The transmission path L may be a wireless or wired transmission path. Transmission path L can transmit for example an optical signal, an electrical signal, and a tone signal.

(Communication Devices 10 to 40)

The kind of the communication devices 10 to 40 is not limited. Examples of the communication devices 10 to 40 may include a near field communication (NFC) terminal, a sensor network communication terminal, a public wireless terminal, a cell phone, and a smartphone. The communication method used by the plurality of communication devices 10 to 40 is not limited. The plurality of communication devices 10 to 40 may communicate for example by a master-slave or peer to peer system.

The plurality of communication devices 10 to 40 each includes a transmitter and a receiver.

(Transmitter)

Each of the plurality of communication devices 10 to 40 includes a transmitter that repeatedly transmits one packet to the transmission path L with the period of the communication device until a prescribed condition is satisfied. According to the embodiment, the communication device 10 repeatedly transmits a packet P1 to the transmission path L with the period T1 until a prescribed condition is satisfied, the communication device 20 repeatedly transmits a packet P2 to the transmission path L with the period T2 until a prescribed condition is satisfied, the communication device 30 repeatedly transmits a packet P3 to the transmission path L with the period T3 until a prescribed condition is satisfied, and the communication device 40 repeatedly transmits a packet P4 to the transmission path L with the period T4 until a prescribed condition is satisfied. The packets P1, P2, P3, and P4 respectively transmitted from the plurality of communication devices 10 to 40 may have the same content or different contents. After the prescribed condition is satisfied, each of the plurality of communication devices 10 to 40 transmits one packet different from the previously transmitted packet to the transmission path L with the period of the communication device until a prescribed condition is satisfied.

For example, the prescribed condition may be correct reception of the packet of the communication device by any of the other communication devices or completion of a prescribed number of repetitions. Whether any of the other communication devices correctly receives a packet from the communication device may be determined on the basis of an error detecting code (for example, a cyclic redundancy check (CRC) or a parity bit) in a responsive packet received from the other communication device. The prescribed condition may be the same or different among the plurality of communication devices 10 to 40.

The period refers to a prescribed time interval and the plurality of communication devices 10 to 40 each repeatedly transmit one packet to the transmission path L so that the time width between a start P of the packet to an end Q of the packet coincides with the time interval. In this way, the packets P1, P2, P3, and P4 respectively sent out from the plurality of communication devices 10 to 40 are repeated on the transmission path L with their respective periods T1, T2, T3, and T4. Note that the time width from the start P to the end Q of a packet may be changed by changing the number of bits included in the packet or the time width of a bit.

How the period is allocated to each communication device is not limited. For example, the periods T1, T2, T3, and T4 may be respectively allocated to the plurality of communication devices 10 to 40 in advance and the allocated periods may be stored in respective storage means provided in the communication devices. Alternatively, the plurality of periods T1, T2, T3, and T4 may be pre-stored in the storage means in each of the plurality of communication devices 10 to 40, and then the plurality of communication devices 10 to 40 each may randomly select one of the plurality of stored periods T1, T2, T3, and T4. If it is determined that communication is not successfully established or has failed to continue, one of the plurality of periods may be randomly selected again. The periods respectively allocated to the plurality of communication devices 10 to 40 are preferably arranged so that the least common multiple of these periods becomes larger. In this way, the number of integration processes can be increased while packets transmitted from the plurality of communication devices 10 to 40 are distinguished individually. Note that according to the embodiment, the periods T1, T2, T3, and T4 are allocated to each of the plurality of communication devices 10 to 40, respectively (where T1<T2<T3<T4).

(Receiver)

The plurality of communication devices 10 to 40 each includes a receiver that integrates a signal on the transmission path L (where the signal on the transmission path L is formed of a plurality of symbols, each of which may be formed of one or a plurality of bits; the present embodiment being exemplified by a configuration in which the plurality of symbols forming the signal on the transmission path L are each formed of one bit) over the periods of the other communication devices (for example at least one of the periods T2, T3, and T4 for the communication device 10) until a prescribed condition is satisfied. In this way, the signal on the transmission path L is separated by time intervals equal to the periods of the other communication devices, and the separated signals are overlapped with one another. If for example the signal on the transmission path L is represented as "11(−1)1(−1)1 . . . " (where the time width of one bit is 1 ms) and the period of another communication device is 2 ms, "11", "(−1)1", and "(−1)1" . . . are overlapped with one another through three integration processes, and "(−1)3" is obtained as an integration result. If for example the signal on the transmission path L is represented as "3(−1)(−1)2(−4)1 . . . " (where the time width of one bit is 2 ms) and the period of another communication device is 1.9 ms, "3(−1)", "(−1)2", "(−4)1" . . . are overlapped with one another through three integration processes, and "(−2)2" is obtained as an integration result.

An example of the prescribed condition may be correct reception of a packet from any of the other communication devices. Whether a packet has been correctly received from any of the other communication devices may be determined on the basis of an error detecting code (for example, a cyclic redundancy check (CRC) or a parity bit) in a packet obtained by the integration.

By integrating the signal on the transmission path L over the periods of the other communication devices, the packets transmitted from the other communication devices may be individually separated and amplified (in amplitude). This is because a packet repeated with one period (for example T2) periodically appears in the process of integration over the period (for example T2), and therefore its integration over the period (for example T2) results in amplification (in amplitude), while a packet repeated with a different period (for example T1, T3, or T4) from the one period (for example T2) does not have the periodicity of being repeated with the one period (for example T2), so that it appears randomly in the process of integration over the one period (for example T2), and its integration over the one period (for example T2) does not result in amplification (in amplitude).

The plurality of communication devices 10 to 40 each needs only perform integration over at least one of the periods of the other communication devices. For example, the communication device 10 needs only perform integration over at least one of the periods T2, T3, and T4, the communication device 20 needs only perform integration over at least one of the periods T1, T3, and T4, the communication device 30 needs only perform integration over at least one of the periods T1, T2, and T4, and the communication device 40 needs only perform integration over at least one of the periods T1, T2, and T3.

[Integration over Period T]

Figure 2:
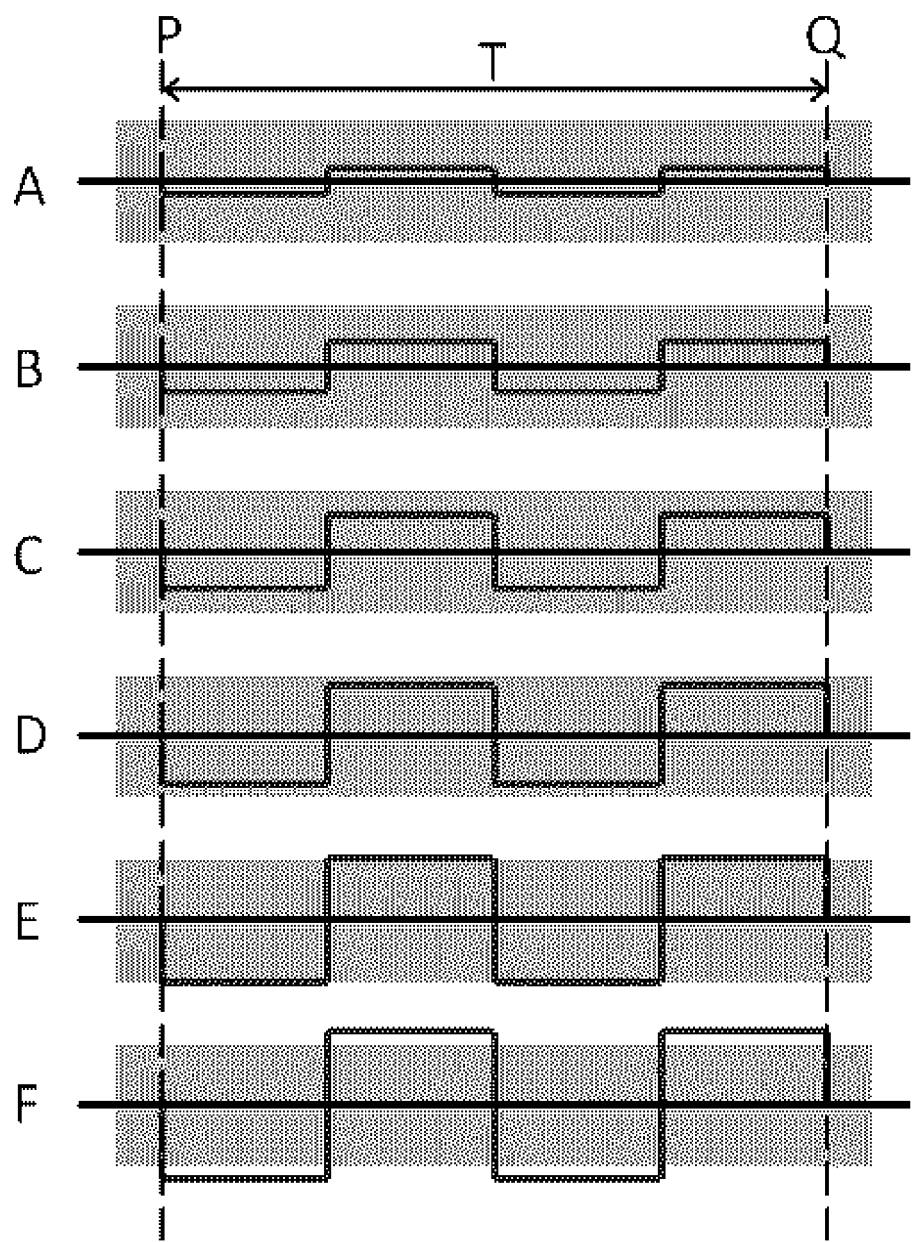
FIG. 2 is a chart showing the concept of how a packet repeated with a period T is separated and extracted from noise including packets repeated with other periods as a signal on a transmission path is integrated over the period T.

FIGS. 2A to 2F are charts showing the concept of how a packet repeated with a period T is separated and extracted from noise including packets repeated with other periods by integrating a signal on the transmission path over the period T. As shown in FIG. 2A, packets repeated with various periods are present on the transmission path L, and therefore a packet repeated with the period T cannot be separated and extracted from noise (in gray) including packets repeated with other periods when the number of integration processes over the period T is small. However, as can be understood from FIG. 2A to FIG. 2E, the packet repeated with the period T is amplified (in amplitude) as the number of integration processes over the period T increases. The amplitude of the packet eventually exceeds the noise (in gray) including the packets repeated with the other periods, and this packet is separated and extracted from the noise as shown in FIG. 2F. Since the number of integration processes is not limited, the packet repeated with the period T can be limitlessly amplified (in amplitude) by increasing the number of integration processes.

FIRST EXAMPLE

Figure 3:
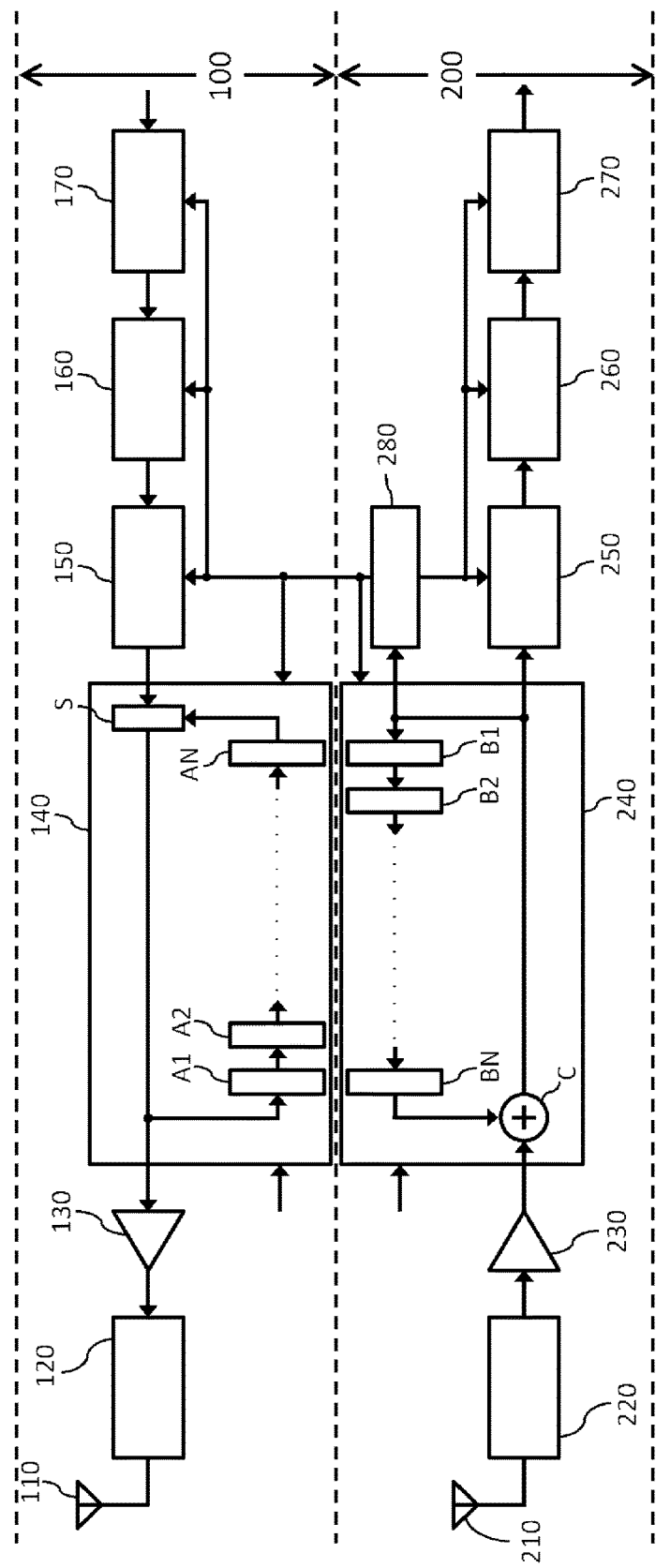
FIG. 3 is a schematic functional diagram of a communication device according to a first example.

FIG. 3 is a schematic functional diagram of a communication device according to a first example. As shown in FIG. 3, the communication device according to the first example includes a transmitter 100 and a receiver 200, which will be described in this order in the following.

[Transmitter 100]

The transmitter 100 includes an antenna portion 110, a modulator 120, a DA converter 130, a repeating unit 140, an encoder 150, an error detecting code generator 160, and a buffer 170. The transmitter 100 may include an error correcting code generator in addition to the error detecting code generator 160. Now, the operation of the transmitter 100 will be described.

A bit string temporarily stored on the buffer 170 is output to the error detecting code generator 160. The error detecting code generator 160 adds an error detecting code to the bit string output from the buffer 170 and outputs the result to the encoder 150. The encoder 150 forms one packet by adding for example a bit string for synchronization and a bit string for packet identification to the bit string output from the error detecting code generator 160 and outputs the formed packet to the repeating unit 140. The repeating unit 140 repeatedly outputs the one packet output from the encoder 150 to the DA converter 130. The DA converter 130 converts the one packet (digital signal) output from the repeating unit 140 into an analog signal and outputs the analog signal to the modulator 120. The modulator 120 modulates a carrier wave using the analog signal output from the DA converter 130 and transmits the result to the transmission path L from the antenna portion 110.

(Repeating Unit 140)

The repeating unit 140 has a selector S and registers A1 to AN. The selector S is connected to either the encoder 150 or the register AN. The number of registers A is equal to the number of bits N (which is an integer equal to or more than 1) of the packet transmitted from the relevant communication device. The number of bits of the packet transmitted from the communication device may be for example prestored in the repeating unit 140 or externally provided as an input to the repeating unit 140. The repeating unit 140 may be implemented by hardware or software. Now, the operation of the repeating unit 140 will be described.

To start with, the repeating unit 140 resets the registers A1 to AN for initialization. The repeating unit 140 then connects the selector S to the encoder 150 and then stores the N bits forming one packet output from the encoder 150 in the registers A1 to AN, respectively. More specifically, when the first bit forming the packet is output from the encoder 150, the repeating unit 140 outputs the bit to the DA converter 130 and also stores the bit in the register A1. When the second bit forming the packet is output from the encoder 150, the repeating unit 140 outputs the bit to the DA converter 130, moves the first bit stored in the register A1 to the register A2, and stores the second bit output from the encoder 150 in the register A1. When the third bit forming the packet is output from the encoder 150, the repeating unit 140 outputs the bit to the DA converter 130, moves the first bit stored in the register A2 to the register A3 and the second bit stored in the register A1 to the register A2, and then stores the third bit output from encoder 150 in the register A1. The repeating unit 140 repeats the above-described process until the N-th bit forming the packet is output from the encoder 150. The repeating unit 140 connects the selector S to the register AN after the N-th bit forming the packet is output from the encoder 150 and outputs the bit stored in the register AN to the DA converter 130. The repeating unit 140 then moves the bits stored in the registers A1 to A(N−1) to the registers A2 to AN, respectively, and stores the bit output to the DA converter 130 in the register A1. The repeating unit 140 repeatedly outputs the N bits forming the packet to the DA converter 130 by repeating the above-described process.

[Receiver 200]

The receiver 200 includes an antenna portion 210, a demodulator 220, an AD converter 230, an integrator 240, a decoder 250, an error detecting code checker 260, a buffer 270, and a synchronizer 280. The receiver 200 may include an error corrector in addition to the error detecting code checker 260. Now, the operation of the receiver 200 will be described.

A signal on the transmission path L received by the antenna portion 210 is input to the demodulator 220. The demodulator 220 demodulates the signal output from the antenna portion 210 and outputs the resultant signal to the AD converter 230. The AD converter 230 converts the signal output from the demodulator 220 into a digital signal (i.e., a bit string) and outputs the digital signal to the integrator 240. The integrator 240 integrates the bit string output from the AD converter 230 while outputting the resultant bit string to the decoder 250. The decoder 250 attempts to detect a bit string for synchronization, a bit string for packet identification, and the like from the bit string output from the integrator 240. Upon detecting these bit strings, the decoder 250 extracts one packet from the bit string output from the integrator 240 using the detection result and outputs the packet to the error detecting code checker 260 and the synchronizer 280. The error detecting code checker 260 checks the bit string output from the decoder 250 for errors and outputs the bit string to the buffer 270. The buffer 270 temporarily stores the bit string output from the error detecting code checker 260. The synchronizer 280 synchronizes the operation of the various components with the bit string output from the integrator 240 using the bit string output from the integrator 240.

(Integrator 240)

The integrator 240 has an adder C and registers B1 to BN. The adder C adds an output from the register BN to a bit (signal) output from the AD converter 230 and outputs the addition result to the decoder 250. The registers B1 to BN each have a sufficient capacity for storing the addition result. The number of registers B is equal to or more than the number of bits of packets output from the other communication devices. When the number of bits of packets to be output from the other communication devices is previously known, the registers B1 to BN as many as the number of bits (N) of the packets to be output from the other communication devices can be used. When the number of bits of packets to be output from the other communication devices is not previously known or packets formed of different numbers of bits must be handled, the number of registers B may be more than the number of bits (N) of the packets to be output from the other communication devices, and dummy bits may be stored in the excess registers (the number of which results from (the number of registers B)−(the number of bits forming the packets)). The number of bits of the packets to be output from the other communication devices may be previously stored for example in the integrator 240 or externally provided as an input to the integrator 240. The communication devices each need only include at least one integrator 240 but may include integrators 240 as many as the number of the other communication devices (three according to the first embodiment). According to this example, the number of integrators 240 is one for sake of simplicity. The integrator 240 may be implemented by hardware or software. Now, the operation of the integrator 240 will be described.

To start with, the integrator 240 resets the registers B1 to BN for initialization. The integrator 240 then stores the first bit output from the AD converter 230 in the register B1. When the second bit is output from the AD converter 230, the integrator 240 moves the first bit stored in the register B1 to the register 32 and then stores the second bit output from the AD converter 230 in the register B1. Then, when the third bit is output from the AD converter 230, the integrator 240 moves the first bit stored in the register B2 to the register B3 and the second bit stored in the register B1 to the register B2 and then stores the third bit output from the AD converter 230 in the register B1. The integrator 240 adds a value stored in the register BN to the N+1-th bit output from the AD converter 230, moves the values stored in the registers B1 to B(N−1) to the registers B2 to BN, respectively, and stores the addition result in the register B1. The integrator 240 integrates a bit string output from the AD converter 230 (which is a bit string obtained by AD-converting a signal on the transmission path) over the periods of the other communication devices by repeating the above-described process until a prescribed condition is satisfied. The integrator 240 resets the registers B1 to BN when the prescribed condition is satisfied.

While the embodiment and the example have been described, the same is by way of illustration and example only, and the features recited in the scope of claims are not limited in any way by the description.

REFERENCE SIGNS LIST

1 Communication system
10 Communication device
20 Communication device
30 Communication device
40 Communication device
100 Transmitter
110 Antenna portion
120 Modulator
130 DA converter
140 Repeating unit
150 Encoder
160 Error detector
170 Buffer
200 Receiver
210 Antenna portion
220 Demodulator
230 AD converter
240 Integrator
250 Decoder
260 Error detector
270 Buffer
A1 to AN Register
B1 to BN Register
C Adder
L Transmission path
P Start of one packet
Q End of one packet
S Selector
T Period

The invention claimed is:

1. A communication system, comprising:
a plurality of communication devices, different periods being respectively allocated to each of the plurality of communication devices;
one transmission path shared by the plurality of communication devices,
the plurality of communication devices each including:
a transmitter that repeatedly transmits one packet to the transmission path until a prescribed condition is satisfied, wherein a time width between a start of the packet to an end of the packet coincides with the respective period of the communication device; and
a receiver that separates a signal on the transmission path by time intervals each equal to the respective period of another communication device of the plurality of communication devices, and overlaps the separated signals with one another until a prescribed condition is satisfied.

2. The communication system according to claim 1, wherein the receiver of each of the plurality of communication devices is configured to separate the signal that is formed of a plurality of symbols, each of which is formed of one bit.

3. The communication system according to claim 1, wherein the receiver of each of the plurality of communication devices is configured to separate the signal that is formed of a plurality of symbols, each of which is formed of a plurality of bits.

4. A communication device sharing one transmission path with another communication device, comprising:
a transmitter that repeatedly transmits one packet to the transmission path until a prescribed condition is satisfied, wherein a time width between a start of the packet to an end of the packet coincides with a period allocated to the communication device; and
a receiver that separates a signal on the transmission path by time intervals each equal to a period allocated to said another communication device, and overlaps the separated signals with one another until a prescribed condition is satisfied, wherein the period allocated to the communication device is different from the period allocated to said another communication device.

5. The communication device according to claim 4, wherein the receiver of the communication device is configured to separate the signal that is formed of a plurality of symbols, each of which is formed of one bit.

6. The communication device according to claim 4, wherein the receiver of the communication device is configured to separate the signal that is formed of a plurality of symbols, each of which is formed of a plurality of bits.

* * * * *